United States Patent
Pfannschmidt

(10) Patent No.: US 9,109,631 B2
(45) Date of Patent: Aug. 18, 2015

(54) SLIP COUPLING WITH AUTOMATIC RELEASE IN THE EVENT OF A PERSISTENT OVERLOAD

(71) Applicant: Siemens Aktiengesellschaft, München (DE)

(72) Inventor: Bernd Pfannschmidt, Rosstal (DE)

(73) Assignee: SIEMENS AG, München (DE)

( * ) Notice: Subject to any disclaimer, the term of this patent is extended or adjusted under 35 U.S.C. 154(b) by 0 days.

(21) Appl. No.: 14/356,085

(22) PCT Filed: Oct. 23, 2012

(86) PCT No.: PCT/EP2012/070914
§ 371 (c)(1),
(2) Date: May 2, 2014

(87) PCT Pub. No.: WO2013/064389
PCT Pub. Date: May 10, 2013

(65) Prior Publication Data
US 2014/0299435 A1   Oct. 9, 2014

(30) Foreign Application Priority Data

Nov. 4, 2011  (DE) .......................... 10 2011 085 786

(51) Int. Cl.
F16D 7/02       (2006.01)
(52) U.S. Cl.
CPC . *F16D 7/02* (2013.01); *F16D 7/028* (2013.01)
(58) Field of Classification Search
USPC ...... 192/56.1, 110 R, 48.91, 48.1, 66.2, 54.2; 464/160, 137
See application file for complete search history.

(56) References Cited

U.S. PATENT DOCUMENTS

| 5,201,391 | A  | * | 4/1993 | Arai et al. ..................... 192/58.4 |
| 6,447,397 | B1 | * | 9/2002 | Jaeger et al. .................... 464/37 |
| 7,166,031 | B2 | * | 1/2007 | Schott et al. .................. 464/137 |

(Continued)

FOREIGN PATENT DOCUMENTS

| DE | 31 45 116 A1 | 5/1983 |
| DE | 198 00 101 A1 | 7/1998 |

(Continued)

OTHER PUBLICATIONS

International Search Report issued by the European Patent Office in International Application PCT/EP2012/070914.

*Primary Examiner* — Ramya Burgess
*Assistant Examiner* — David J Hlavka
(74) *Attorney, Agent, or Firm* — Henry M. Feiereisen LLC.

(57) ABSTRACT

A slip coupling includes two coupling elements and a clamping nut screwed onto one coupling element to press the other coupling element against the one coupling element so that a torque acting on one coupling element is transmitted slip-free to the other coupling element and limited to a sliding torque as the coupling elements slip against one another. Free play disks are disposed between the clamping nut and the other coupling element. Interacting driver elements received by the clamping nut, the free play disks and the other coupling element enable the coupling elements to slip against one another up to a critical angle without rotation of the clamping nut. When clamping nut is caused to rotate, a contact pressure of the other coupling element on the one coupling element and thereby a holding torque transmittable in a slip-free manner is changed.

12 Claims, 3 Drawing Sheets

(56) References Cited

U.S. PATENT DOCUMENTS

| | | |
|---|---|---|
| 7,411,323 B2 | 8/2008 | Pfannschmidt |
| 7,555,988 B2 | 7/2009 | Pfannschmidt |
| 7,714,467 B2 | 5/2010 | Pfannschmidt |
| 7,812,486 B2 | 10/2010 | Pfannschmidt |
| 2008/0289928 A1 | 11/2008 | Abraham et al. |
| 2009/0205921 A1* | 8/2009 | Burns et al. .......... 192/56.1 |

FOREIGN PATENT DOCUMENTS

| | | |
|---|---|---|
| DE | 10 2004 026 412 B3 | 10/2005 |
| DE | 10 2005 053 896 B3 | 1/2007 |
| DE | 10 2007 032 412 A1 | 1/2009 |
| EP | 0 647 791 A1 | 4/1995 |
| GB | 2 321 504 A | 7/1998 |

* cited by examiner

SLIP COUPLING WITH AUTOMATIC RELEASE IN THE EVENT OF A PERSISTENT OVERLOAD

CROSS-REFERENCES TO RELATED APPLICATIONS

This application is the U.S. National Stage of International Application No. PCT/EP2012/070914 filed Oct. 23, 2012, which designated the United States and has been published as International Publication No. WO 2013/064389 and which claims the priority of German Patent Application, Serial No. 102011085786.9, filed Nov. 4, 2011, pursuant to 35 U.S.C. 119(a)-(d).

BACKGROUND OF THE INVENTION

The present invention relates to a slip coupling,
wherein the slip coupling has a pair of coupling elements,
wherein the two coupling elements are rotatable about a common axis of rotation and have a coupling surface that is annularly circumferential around the axis of rotation in each case.

Such slip couplings are well known—particularly in the railroad industry.

Drives for rail vehicles often comprise a motor which is mounted in a wheel truck (bogie) of the rail vehicle, and a gearbox which is in turn mounted on the driving wheel axle of the rail vehicle and supported on the wheel truck via a torque support arm. Also usually disposed between the motor and the gearbox is a universal (Cardan) coupling which compensates the relative movement between the wheel truck and the driving wheel axle and transmits the drive torque from the motor to the driving wheel axle.

During normal operation, such rail drives produce acceleration torques (possibly in both directions) and deceleration torques (possibly likewise in both directions). This causes the rail vehicle and other rail vehicles coupled to the rail vehicle to be accelerated and decelerated accordingly. These normal torques are occasionally exceeded by very brief, in some cases very greatly increased so-called short-circuit torques which may result from the interaction of a power converter feed and the motor. The rail drive can be designed such that these large short-circuit torques are absorbed by all the supporting parts within the drive unit. Alternatively, the effect of the short-circuit torques has to be limited. To limit the effect, load-reducing elements such as a slip coupling of the type described above are generally provided.

During operation, rail drives may also encounter fault situations in which the design torque of the drive is persistently exceeded for an extended period of time. This is the case, for example, if damage occurs in the motor, as a result of which the rotor of the motor is no longer adequately guided. In individual cases this can cause the rotor to rub or even jam in the stator bore of the motor. In particular, such jamming of the rotor can result in consequential damage which may reach a considerable degree of severity. In order to prevent such damage, it is necessary not only to limit the torque transmitted via the slip coupling, but also to release the slip coupling so that torque transmission (the frictional connection) between motor and driving wheel axle is interrupted.

SUMMARY OF THE INVENTION

The object of the present invention is to further develop a slip coupling of the type mentioned in the introduction such that it removes the frictional connection between its coupling elements automatically and mandatorily in the event of a persistent overload. However, the release shall not take place immediately the first time the overload occurs, but only if the overload persists for an extended period of time.

The object is achieved in accordance with the invention by a slip coupling having a pair of coupling elements, wherein the two coupling elements are rotatable about a common axis of rotation and each have a coupling surface that is annularly circumferential about the axis of rotation, wherein one of the two coupling elements has a threaded journal disposed in line with the axis of rotation, onto which threaded journal a clamping nut is screwed by means of which the coupling surface of the other coupling element can be pressed against the coupling surface of the first coupling element so that a torque acting on one of the two coupling elements is transmitted to the other coupling element in a slip-free manner up to a holding torque and, beyond that, is limited to a sliding torque as the two coupling elements slip against one another, a number of free play disks are disposed between the clamping nut and the other coupling element, the clamping nut, the free play disks and the other coupling element have interacting driver elements, the driver elements allow the two coupling elements to slip against one another up to a critical angle without rotation of the clamping nut and, in the event of slippage of the two coupling elements against one another beyond the critical angle, force the clamping nut to co-rotate, and when the clamping nut rotates, the contact pressure of the coupling surface of the other coupling element against the coupling surface of the first coupling element and, as a result, the holding torque that can be transmitted in a slip-free manner is changed.

Advantageous embodiments of the slip coupling according to the invention are set forth in the dependent claims.

The provision of the free play disks in conjunction with the thereby allowed slippage of the coupling elements up to the critical angle prevents immediate release of the frictional connection of the coupling elements. The enforced rotation of the clamping nut causes the slip coupling to be automatically released in the event of an overload continuing for an extended period.

The slip coupling, as has been explained above, only operates correctly in one torque direction. If the torque direction in which the overload occurs is not known in advance, it is therefore necessary to use a pair of slip couplings, wherein the two slip couplings are each implemented as a slip coupling as described above, wherein one of the coupling elements of one slip coupling is non-rotatably connected to one of the coupling elements of the other slip coupling, wherein the threaded journals of the two slip couplings are provided with threads running in opposite directions.

BRIEF DESCRIPTION OF THE DRAWING

The above described characteristics, features and advantages of this invention and the way in which they are achieved will become clearer and more readily understandable in conjunction with the following description of exemplary embodiments which are explained in greater detail with reference to the accompanying schematic drawings in which.

DETAILED DESCRIPTION OF PREFERRED EMBODIMENTS

Figure 1:
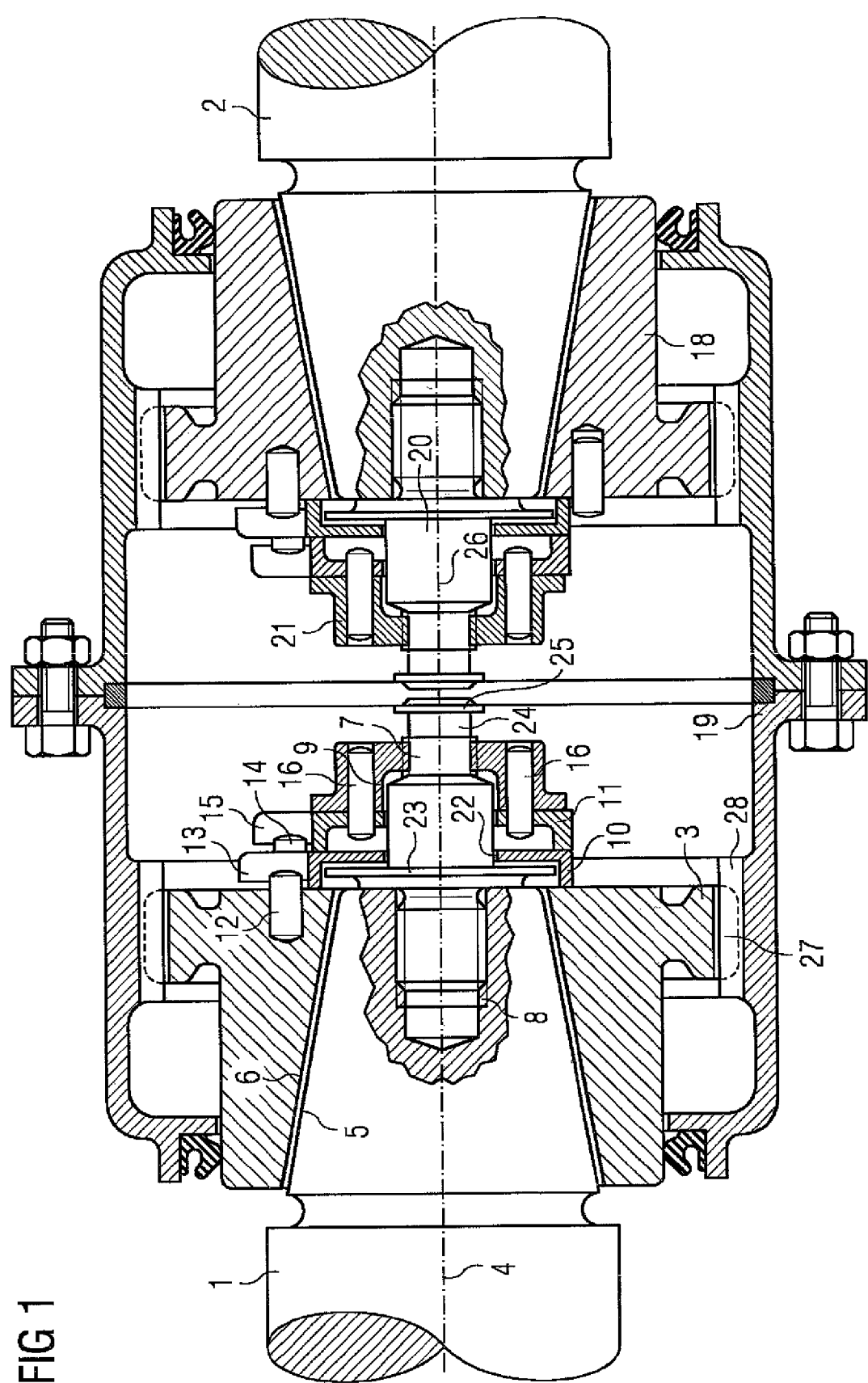
FIG. 1 shows a longitudinal section through a pair of interconnected slip couplings and FIGS. 2 to 5 each show a plan view of one of the slip couplings from FIG. 1 in different operating states of the slip coupling.

As shown in FIG. 1, a slip coupling is disposed between a drive (the drive shaft 1 is visible in FIG. 1) and a load (the load shaft 2 is visible in FIG. 1). The drive can be implemented, for example, as an electric drive for a rail vehicle, the load as a driving wheel or driving wheel set of the rail vehicle.

The slip coupling has at least one pair of coupling elements 1, 3 which rotate about a common axis of rotation 4 and have a coupling surface 5, 6 that is annularly circumferential around the axis of rotation 4 in each case. The coupling elements 1, 3 can be independent elements. Preferably, however, one of the coupling elements 1, 3 can be identical to the load shaft 2 or—as shown in FIG. 1—identical to the drive shaft 1. As illustrated in FIG. 1, the coupling surfaces 5, 6 can be implemented as conical surfaces. Alternatively, they can also be surfaces which are oriented at right angles to the axis of rotation 4. Torque is transmitted from the drive to the load and vice versa via the coupling surfaces 5, 6.

Where the terms "axial", "radial" and "tangential" are used below, they are always referred to the axis of rotation 4. The term "axial" means a direction parallel to the axis of rotation 4. The term "radial" means a direction perpendicular to the axis of rotation 4 toward or away from the axis of rotation 4 as the case may be. The term "tangential" means a direction running perpendicular to both the axial direction and the radial direction. The tangential direction therefore encircles the axis of rotation 4 at a constant distance therefrom.

One of the two coupling elements 1, 3—according to FIG. 1 the drive-side coupling element 1—has a threaded journal 7. The threaded journal 7 is disposed in line with the axis of rotation 4. It is secured to the corresponding coupling element 1 so that it cannot become accidentally detached from the corresponding coupling element 1. For example, the threaded journal 7 can be (partially) screwed into a corresponding female thread 8 of the corresponding coupling element 1 and then locked against further rotation, e.g. by welding, gluing or wedging. It is also possible for the threaded journal 7 to be integrally connected to the corresponding coupling element 1.

A clamping nut 9 is screwed onto the threaded journal 7. The clamping nut 9 acts on the coupling surface 6 of the other coupling element 3. In particular, it presses the coupling surface 6 of the other coupling element 3 against the coupling surface 5 of the first coupling element 1. Because of the pressing of the coupling surfaces 5, 6 against one another, the coupling elements 1, 3 are able to transmit the torque between drive and load.

Because of the pressing of the coupling surfaces 5, 6 against one another, the coupling surfaces 5, 6 are in frictional connection with one another. Therefore, slip-free transmission of the torque only takes place if the torque to be transmitted is lower than a holding torque. On the other hand, if the torque to be transmitted exceeds the holding torque, the coupling elements 1, 3 slip against one another. In this case, the torque actually transmitted is limited to a sliding torque, wherein the sliding torque is smaller than the holding torque.

The clamping nut 9 does not act directly on the other coupling element 3 but via a number of free play disks 10, 11 which are disposed between the clamping nut 9 and the other coupling element 3. At minimum, a single free play disk 10, 11 is present. In general a plurality of free play disks 10, 11 are present, e.g. two free play disks 10, 11 as shown in FIG. 1. In practice more than two free play disks 10, 11 are often present, e.g. three to six free play disks 10, 11.

The clamping nut 9, the free play disks 10, 11 and the other coupling element 3 have interacting driver elements 12 to 16. The driver elements 12 to 16 are designed such that, although they allow rotational movement of the other coupling element 3 relative to the adjacent free play disk 10, of the free play disk 10 adjacent to the other coupling element 3 relative to the next free play disk 11, etc., this rotational movement is not free, but—referred to the axis of rotation 4—is limited to a respective angular range a (see FIG. 2). The respective angular range a between directly adjacent elements 3, 10, 11, 9 (other coupling element 3, free play disks 10, 11 and possibly clamping nut 9) is self-evidently less than 360°, e.g. 300°. The total possible rotational range, i.e. the sum of the individual angular ranges, constitutes a critical angle. The critical angle can be greater than 360°.

The holding and frictional inter-relationships of the other coupling element 3, the free play disks 10, 11 and possibly the clamping nut 9 and the holding and frictional relationships of the clamping nut 9 to the threaded journal 7 are mutually adjusted such that the coupling elements 1, 3 rotate against one another within the total permissible rotational range, without rotating the clamping nut 9. When the coupling elements 1, 3 slip against one another, the other coupling element 3 rotates relative to the adjacent free play disk 10, the adjacent free play disk 10 rotates relative to the next free play disk 11, etc. and possibly the last free play disk 11 also rotates relative to the clamping nut 9. However, the clamping nut 9 itself is not rotated.

The corresponding adjustment of the holding and frictional relationships is well known to persons skilled in the art. For example, the material and lubrication conditions can be selected accordingly. It is also possible to interpose, at a suitable location, rubber elements which locally affect the grip. It is also possible, for example, to lightly glue the clamping nut 9 to the threaded journal 7 or install, between the threaded journal 7 and the clamping nut 9, an elastomer layer which makes it sufficiently difficult but not impossible for the clamping nut 9 to rotate on the threaded journal 7.

Due to the appropriate mutual adjustment of the holding and frictional relationships, in the event of increased torque a relative rotation of the coupling elements 1, 3 against one another therefore takes place without the clamping nut 9 being rotated relative to the first coupling element 1. This applies until the relative rotation of the coupling elements 1, 3 against one another reaches the total permissible rotation range—i.e. the critical angle. Thereafter, further rotation of the coupling elements 1, 3 against one another is mandatorily accompanied by rotation of the clamping nut 9.

The rotation of the clamping nut 9 changes the contact pressure of the coupling surface 5 of the first coupling element 1 on the coupling surface 6 of the other coupling element 3. The changed contact pressure also simultaneously changes the holding torque transmittable in a slip-free manner and, correspondingly thereto, also the corresponding sliding torque.

The corresponding change in contact pressure is particularly important if the contact pressure of the coupling surfaces 5, 6 against one another is reduced by the rotation of the clamping nut 9. This is because reducing the contact pressure causes the holding torque and sliding torque to decrease, so that the coupling elements 1, 3 slip against one another even more lightly than before. A self-reinforcing effect therefore occurs.

The above explained principle of the present invention will now be briefly restated with additional reference to FIGS. 2 to 5. FIGS. 1 to 5 essentially show—purely by way of example—that exactly two free play disks 10, 11 are present which will hereinafter be referred to as element-side free play disk 10 and nut-side free play disk 11. However, it is once again pointed out that the number of free play disks 10, 11 is not critical.

Figure 2:
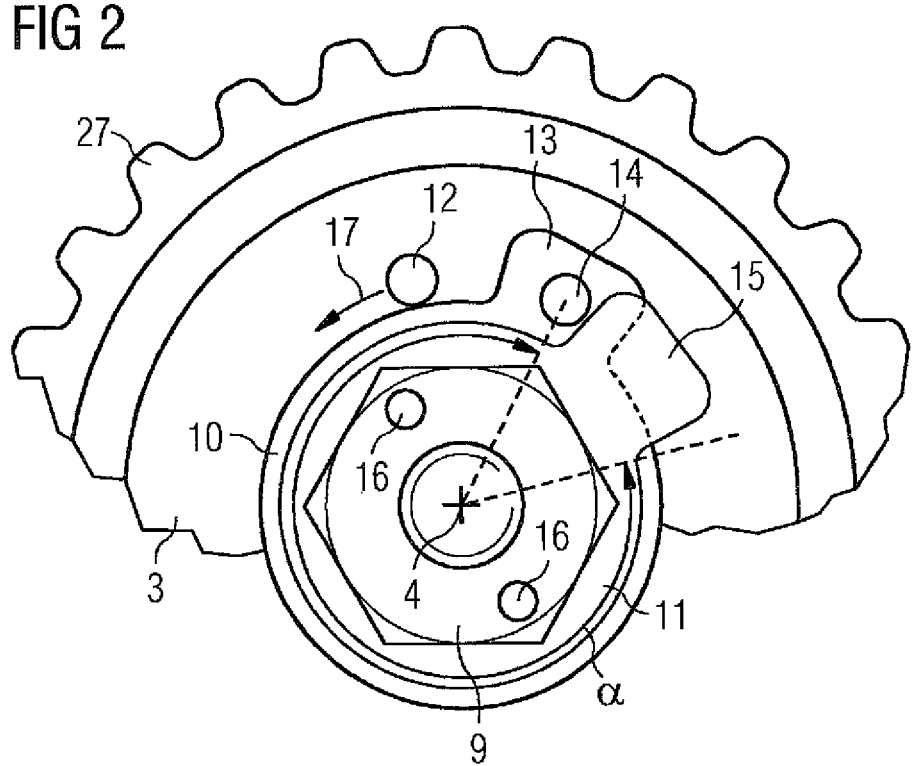

FIG. 2 shows a plan view of the coupling elements 1, 3 in an initial state. As driver elements 12, 13 between the other coupling element 3 and the element-side free play disk 10, the other coupling element 3 has a pin 12 which extends in the axial direction. The pin 12 acts in conjunction with a radially projecting lug 13 which is the corresponding driver element 13 of the element-side free play disk 10. The pin 12 of the other coupling element 3 initially rests against the (in FIG. 2) left-hand side of the lug 13 of the element-side free play disk 10.

In a similar embodiment, as driver elements 14, 15 between the free play disks 10, 11 there is provided on the element-side free play disk 10 an axially projecting pin 14 which acts in conjunction with a lug 15 which is disposed on the nut-side free play disk 11 and extends in the radial direction. In particular, the pin 14 can be disposed on the lug 13 of the element-side free play disk 10. However, this is not absolutely necessary. The clamping nut 9 is non-rotatably connected to the nut-side free play disk 11 via driver elements 16, e.g. via the pins 16 shown in FIGS. 1 to 5. Alternatively, an antirotational connection can be achieved e.g. via spot welds. It is also possible for the clamping nut 9 to interact with the nut-side free play disk 11 in a similar manner to the free play disks 10, 11 with one another and the element-side free play disk 10 with the other coupling element 3.

Figure 3:
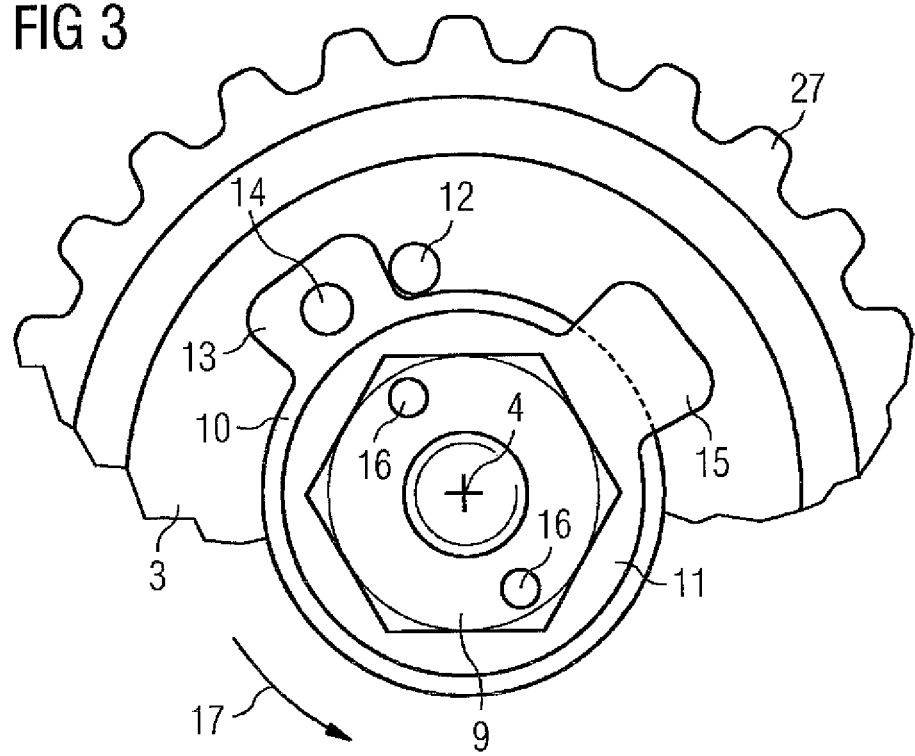
Figure 4:
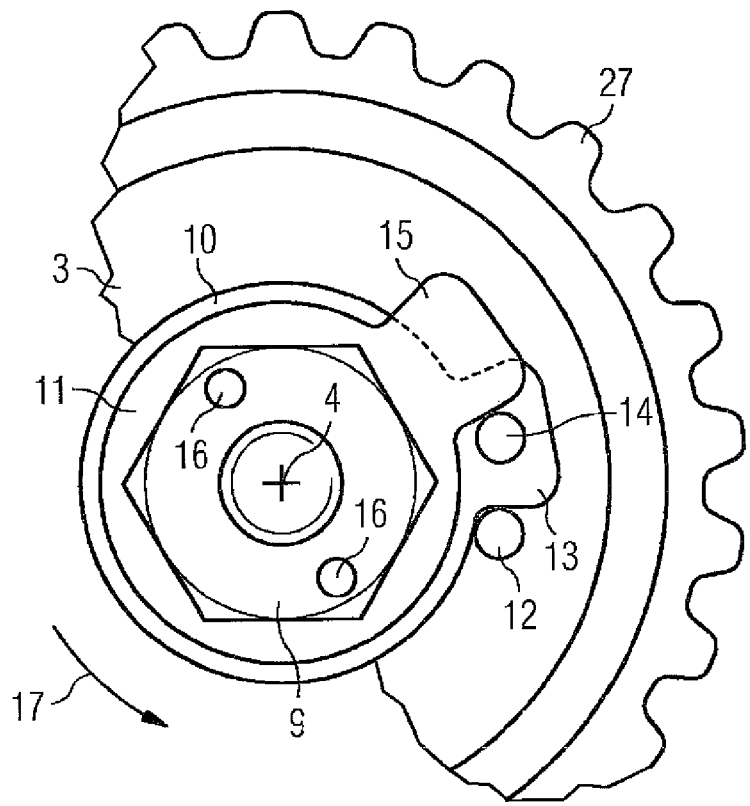

When the other coupling element 3 slips relative to the first coupling element 1 according to the arrow denoted by reference character 17 in FIG. 2, the pin 12 of the other coupling element 3 travels in the direction of the arrow 17, i.e. counter-clockwise in the present case, until the pin 12 bears against the (in FIG. 2) right-hand side of the lug 13 of the element-side free play disk 10. Thereafter, further slippage of the coupling elements 1, 3 against one another is accompanied by rotation of the element-side free play disk 10. The lug 13 of the element-side free play disk 10 and therefore also the pin 14 of the element-side free play disk 10 thus likewise travels in the direction of the arrow 17 in the event of further rotation of the coupling elements 1, 3 against one another. This state is illustrated in FIG. 3. Further rotation of the coupling elements 1, 3 against one another without rotation of the clamping nut 9 is possible until the pin 14 of the element-side free play disk 10 bears against the (in FIGS. 2 and 3) lower side of the lug 15 of the nut-side free play disk 11. This state is shown in FIG. 4.

Figure 5:
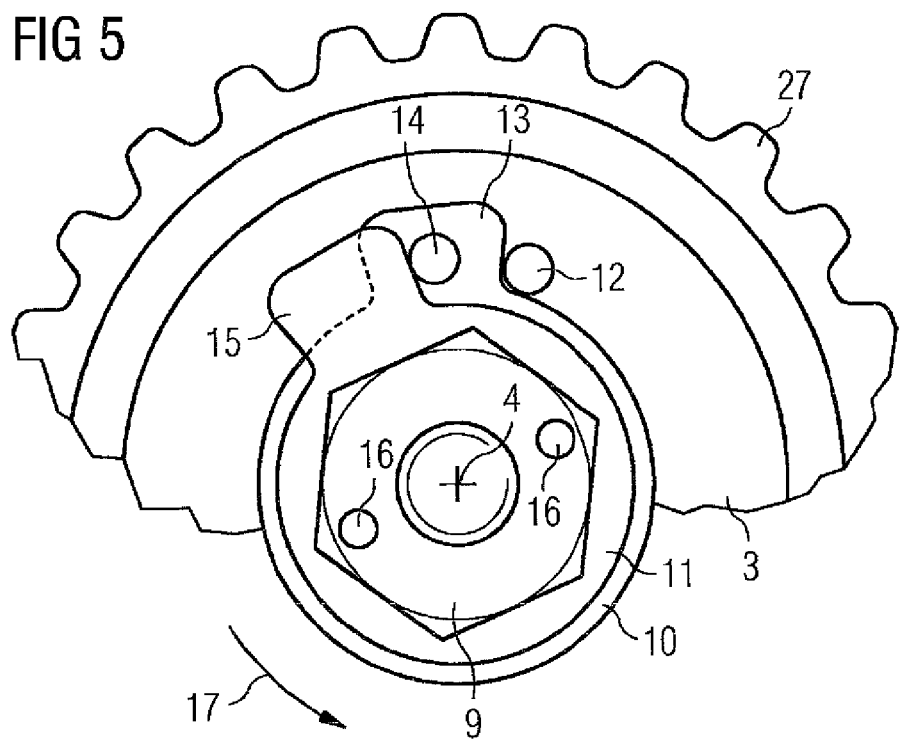

Since up to this point the clamping nut 9 has not yet rotated, the pressure of the contact surfaces 5, 6 against one another has hitherto remained unchanged. However, if the coupling elements 1, 3 continue rotating against one another, as shown in FIG. 5 the clamping nut 9 is also forced to rotate with them, thereby changing the contact pressure state of the coupling surfaces 5, 6. In particular, the clamping nut 9 is released if the threaded journal 7 has a right-hand thread.

Conversely, if the coupling elements 1, 3 rotate counter to the direction of the arrow 17, the clamping nut 9 will be tightened more strongly, thereby increasing the holding torque. This is generally undesirable. The slip coupling, as it has been explained hitherto, is therefore only adequate if the direction of rotation in which a torque is transmitted between the coupling elements 1, 3—in the direction of the arrow 17 or counter, to the direction of the arrow 17—is known in advance. The thread of the threaded journal 7 can be implemented as a left-hand thread or a right-hand thread according to the direction of transmission.

However, if the direction in which the torque to be transmitted will act is not known in advance, a pair of slip couplings are preferably used, as shown in FIG. 1. The two slip couplings can each be implemented as explained above. The load-side coupling element 3 of one slip coupling is in this case non-rotatably connected to the drive-side coupling element 18 of the other slip coupling, e.g. directly or—as shown in FIG. 1—via a sleeve 19. However, the threaded journals 7, 20 of the two slip couplings are provided with threads running in opposite directions (one left-hand, one right-hand).

If two slip couplings whose threaded journals 7, 20 have threads running in opposite directions are present, prolonged slippage of coupling elements 1, 2, 3, 18 against one another can directly cause the clamping nut 9, 21 to be released, thereby opening the corresponding slip coupling. Alternatively, the "wrong" clamping nut 9, 21 is tightened. However, the thereby caused increase in the associated holding and sliding torque of the corresponding slip coupling means that subsequently the "correct" coupling elements 1, 3 or 2, 18 as the case may be are rotated against one another and, as a result, the "correct" clamping nut 9, 21 is then released.

In the following remarks, the initially explained slip coupling will now be considered in greater detail. However, the corresponding remarks apply equally to the other slip coupling, if present.

Although the free play disks 10, 11 must be rotatable about the axis of rotation 4 and be able to transmit axial forces, they are fixed in the radial direction. The threaded journal 7 therefore preferably has a centering collar 22. The centering collar 22 serves to keep the free play disks 10, 11 centered radially with respect to the axis of rotation 4.

Moreover, the frictional connection between the coupling elements 1, 3 must preferably be released when the clamping nut 9 rotates. In addition, however, sufficient centering of the coupling elements 1, 3 relative to one another shall also be ensured. For this reason, there is preferably disposed on one coupling element 1 a coupling retention element 23 by means of which an axial displacement of the other coupling element 3 relative to the first coupling element 1 is limited. As shown in FIG. 1, the coupling retention element 23 can be implemented as a stop collar, for example.

If the clamping nut 9 is released due to rotation of the clamping nut 9, the frictional connection of the coupling elements 1, 3 is removed by the loosening of the clamping nut 9. The coupling elements 1, 3 then therefore always execute a relative rotational movement with respect to one another if even a small torque is applied. It must therefore be ensured that the clamping nut 9 does not continue to rotate. This can be achieved, for example, by dimensioning the driver elements 12 to 16 of the other coupling element 3, of the free play disks 10, 11 and of the clamping nut 9 such that, after the release of the clamping nut 9, the driver elements 12, 16 are spaced axially apart from one another. As a result, free rotation of the play disks 10, 11 about the axis of rotation 4 is possible without further rotation of the clamping nut 9. The clamping nut 9 remains disposed on the threaded journal 7 in this state.

Alternatively or additionally, the end of the threaded journal 7 can have an unthreaded section 24. In this case the clamping nut 9, when it is in the unthreaded section 24, is freely rotatable about the axis of rotation 4 without axial movement.

The clamping nut 9 must also preferably be retained on the threaded journal 7 after release. For this purpose, a nut retaining element 25 by means of which axial movement of the clamping nut 9 is limited is preferably disposed on the threaded journal 7.

It is possible for the slip coupling (or the pair of slip couplings as the case may be) to be disposed in an axially non-displaceable manner. However, the slip coupling is preferably cardanically suspended via one of its coupling elements 1, 3 in a sleeve 19 radially surrounding the slip coupling externally. The sleeve 19 can also be the sleeve which, in the case of a pair of slip couplings, possibly interconnects two coupling elements 3, 18 in a non-rotatable manner. Due to the corresponding suspension of the corresponding coupling element 3 in the sleeve 19, tilting of a sleeve axis 26 compared to the axis of rotation 4 is possible. For example, one of the coupling elements 3—alternatively this can always be the drive-side coupling element 18 or the load-side coupling element 3—can have radially on the exterior an external toothed rim 27 which is guided in a corresponding internal toothed rim 28 of the sleeve 19. This provides on the one hand a non-rotatable connection of the corresponding coupling element 3 to the sleeve 19. However, on the other hand, tilting of the axis of rotation 4 against the sleeve axis 26 is possible. In particular, in the case of a pair of slip couplings as shown in FIG. 1 the load-side coupling element 3 of one slip coupling and the drive-side coupling element 18 of the other slip coupling can be suspended in the sleeve 19 in this way.

In practice, the slip coupling according to the invention can be used, for example, for rail drives. In this case the slip coupling is dimensioned such that it transmits the torques occurring during normal operation without slippage. Slipping of the coupling elements 1, 3 against one another only occurs in special situations wherein two cases are basically possible. Once case is the occurrence of a short-circuit torque. Such short-circuit torques occur only very rarely and only very briefly. This special situation is contained by it being possible for the coupling elements 1, 3 to slip against one another up to the critical angle without rotating the clamping nut 9. The number of free play disks 10, 11 and the permissible angle of rotation of each free play disk 10, 11 can be determined accordingly. The other case is drive- or even load-side jamming. In this case permanent slipping of the slip coupling is produced so that the clamping nut 9 is very rapidly released. This release takes place as soon as the slippage of the coupling elements 1, 3 exceeds the critical angle.

The present invention has many advantages. In particular, it provides a simple means of protecting the drive train from physical damage in the event of persistently elevated torques.

Although the invention has been illustrated and described in detail by the preferred exemplary embodiment, the invention is not limited to the disclosed examples and other variants may be deduced therefrom by the average person skilled in the art without departing from the scope of protection sought for the invention.

The invention claimed is:

1. A slip coupling, comprising:
a pair of coupling elements rotatable about a common axis of rotation, each said coupling element having a coupling surface annularly circumferential about the axis of rotation, one of the two coupling elements having a threaded journal disposed in line with the axis of rotation;
a clamping nut screwed onto the threaded journal and configured to press the coupling surface of the other one of the coupling elements against the coupling surface of the one of the coupling elements so that a torque acting on one of the two coupling elements is transmitted in a slip-free manner to the other one of the coupling elements up to a holding torque and limited to a sliding torque as the coupling elements slip against one another;
a number of free play disks disposed between the clamping nut and the other one of the coupling elements;
driver elements interacting with one another and received by the clamping nut, the free play disks and the other one of the coupling element, said driver elements enabling the coupling elements to slip against one another up to a critical angle without rotation of the clamping nut, and in the presence of a slippage of the coupling elements against one another beyond the critical angle, causing a co-rotation of the clamping nut with the driver elements, wherein the co-rotation of the clamping nut causes a change of a contact pressure of the coupling surface of the other one of the coupling elements on the coupling surface of the one of the coupling elements and thereby causes a change of a holding torque transmittable in a slip-free manner.

2. The slip coupling of claim 1, wherein the coupling surfaces have a conical configuration.

3. The slip coupling of claim 1, wherein the threaded journal is securely connected to the one of the coupling elements.

4. The slip coupling of claim 1, wherein the clamping nut is connected to an adjacent one of the free play disks in a non-rotatable manner.

5. The slip coupling of claim 1, wherein the threaded journal has a centering collar configured to keep the free play disks centered radially with respect to the axis of rotation.

6. The slip coupling of claim 1, further comprising a coupling retention element disposed on the one of the coupling elements and configured to limit an axial displacement of the other one of the coupling elements relative to the one of the coupling elements.

7. The slip coupling of claim 1, wherein the driver elements are dimensioned such that, after release of the clamping nut, the driver elements are axially spaced apart from one another to thereby permit a free rotation of the free play disks about the axis of rotation without further rotation of the clamping nut.

8. The slip coupling of claim 1, wherein the threaded journal has one end provided with an unthreaded section so that the clamping nut, when positioned in the unthreaded section, is able to rotate freely about the axis of rotation without axial movement.

9. The slip coupling of claim 1, further comprising a nut retaining element disposed on the threaded journal and configured to limit an axial movement of the clamping nut.

10. The slip coupling of claim 1, wherein the slip coupling is cardanically suspended.

11. The slip coupling of claim 10, wherein, to implement the cardanic suspension, one of the coupling elements has radially on an exterior an external toothed rim which is guided in an internal toothed rim of a sleeve radially surrounding the slip coupling on the exterior.

12. A pair of slip couplings, each of the slip couplings including a pair of coupling elements rotatable about a common axis of rotation, each said coupling element having a coupling surface annularly circumferential about the axis of rotation, one of the two coupling elements having a threaded journal disposed in line with the axis of rotation, a clamping nut screwed onto the threaded journal and configured to press the coupling surface of the other one of the coupling elements against the coupling surface of the one of the coupling elements so that a torque acting on one of the two coupling elements is transmitted in a slip-free manner to the other one of the coupling elements up to a holding torque and limited to a sliding torque as the coupling elements slip against one another, a number of free play disks disposed between the clamping nut and the other one of the coupling elements, driver elements interacting with one another and received by the clamping nut, the free play disks and the other one of the coupling element, said driver elements enabling the coupling elements to slip against one another up to a critical angle without rotation of the clamping nut, and in the presence of a slippage of the coupling elements against one another beyond the critical angle, causing a co-rotation of the clamping nut with the driver elements, wherein the co-rotation of the clamping nut causes a change of a contact pressure of the coupling surface of the other one of the coupling elements on the coupling surface of the one of the coupling elements and thereby causes a change of a holding torque transmittable in a slip-free manner, wherein one of the coupling elements of one slip coupling is non-rotationally connected to one of the coupling elements of the other slip coupling, and wherein the threaded journals of the two slip couplings are provided with threads running in opposite directions.

* * * * *